Dec. 31, 1935.  W. RUNGE  2,026,361
RECEIVER
Filed Feb. 9, 1933
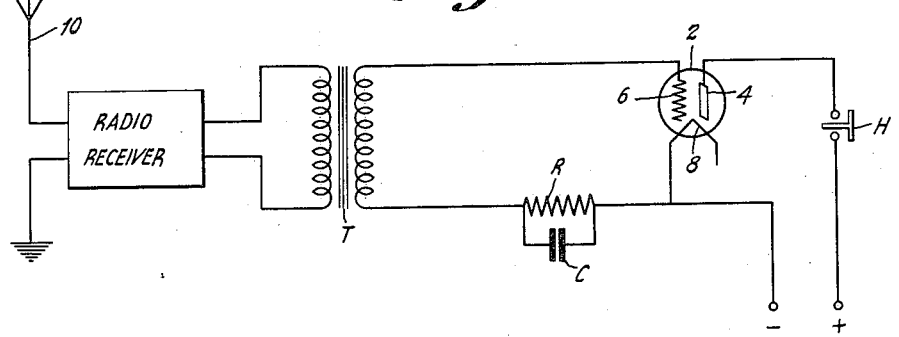
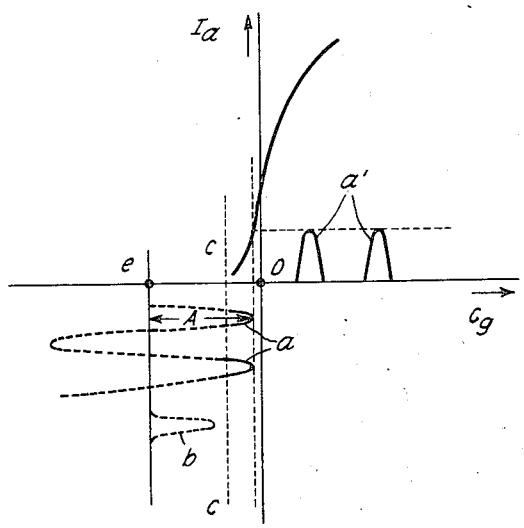
INVENTOR
WILHELM RUNGE
BY
ATTORNEY Patented Dec. 31, 1935

2,026,361

UNITED STATES PATENT OFFICE 2,026,361

RECEIVER

Wilhelm Runge, Berlin, Germany, assignor to Telefunken Gesellschaft für Drahtlose Telegraphie m. b. H., Berlin, Germany, a corporation of Germany Application February 9, 1933, Serial No. 655,889
In Germany March 24, 1932

2 Claims. (Cl. 250—11)

This invention relates to a method of and receiver arrangement for insuring more precise identification of the overlap zone produced by two directive beams serving as a route (course) indicator or course boundary line.

For the purpose of piloting marine and aerial vessels and craft it is known in the prior art to send out from a fixed point two differently orientated electromagnetic beams or radiations and to coordinate to these latter different identification signals so that the part of the overlapping zone of these two radiations wherein their signals are received with like intensity or volume may be used as a course line or as a route limiting line. If the two signals bear a complementary relationship to each other (by being constituted by selected Morse-code signals such as $a$ and $n$), then the zone of like reception will be identifiable upon the reception of two signals which combine to produce a continuous dash of unvaried intensity.

However, it is extremely important in practice that the points of like reception of both signals may be identified with as much precision as possible. The prerequisite therefor would consist in providing ways and means adapted to make any dissimilarity or inequality in the signal strength or volume of the said two signals perceptible with high precision. To this end it has been suggested in the prior art to use receiver equipment whereby, inside a definite intensity range, the stronger signals will always be amplified more strongly than the feebler ones in order that in this manner the intensity differences of the incoming signals may be rendered more conspicuous and evident. However, receiving arrangements predicated upon the said idea involve this demerit that they will not be equally operative in the desired sense at all distances between the transmitter station and the receiving equipment. For instance, if they work fairly efficiently at relatively great distances, they are often no longer capable of insuring precise differentiation between the two signal strengths at close proximity to the transmitter (which are then both inherently strong) though usually precise steering and keeping on the prescribed course becomes increasingly imperative as the receiver approaches the transmitter.

Now, the present invention discloses a receiver arrangement in which sharp distinction and differentiation is insured for all distances coming into consideration. According to the invention, arrangements are so made that the sensitiveness or responsiveness of the receiver will be so acted upon by the stronger signals that the feebler signals will not be perceived at all or only weakly so, in the presence of a given signal rhythm.

My invention is schematically illustrated in the attached drawing showing in Figure 1 a practical embodiment by way of example, and in Figure 2 curves illustrating the operation of the circuit of Figure 1.

Figure 1 shows a receiver according to the invention adapted to insure self-regulation of the reproducing volume or signal strength. This receiver includes a signal pick-up device 10 connected with radio frequency amplifying and demodulating means 12 of any known type. The unit 10 is connected by way of a transformer T to any audio frequency stage, for example the last stage feeding the input electrodes 6 and 8 of a tube 2 by way of a resistance R and condenser C. The anode 4 of tube 2 is connected with the telephone receiver H provided, for instance, to act as the receiving indicator device. In its grid circuit is included a suitably dimentioned ohmic resistance R, and in parallel relation thereto a condenser C whose capacity is likewise considerable in size. In signal reception the oscillations coming in by way of the transformer T exercise an effect upon the grid potential which resembles the audion action known in the art and produces rectified current which flows in the grid circuit. The grid will be charged negatively an amount which increases as the amplitude of the oscillations increases. As a result, in the working characteristic of the tube (see Figure 2) point $e$ indicating mean negative biasing voltage will be shifted so much farther towards the left-hand side, the intenser the incoming oscillations. For example, if the oscillations $a$ of the stronger signal furnished from the transformer of the stage under consideration have amplitude $a$, and if the negative biasing potential is caused to assume the value $oe$ by these oscillations, then the peaks of these oscillations emphasized by heavy lines in Figure 2, which exceed or are less negative than the "stopper or blocking" limit CC, will be able to control the tube and result in perceptible plate currents $a'$. If, then, after termination of the stronger signal impulses the feebler signal (whose impulses, for instance, may be complementary in reference to the former) comes in, the transformer of the stage in question will furnish oscillations $b$. If the size of the resistance R and the capacity of the condenser C have been suitably chosen in relation to the repetition periods of the impulses transmitted in either of the directional beams, then there will not be sufficient time to allow of an essential change in the grid biasing potential in response to a weak signal following the negative charge of a strong signal. It will be seen therefore, that the oscillations $b$ will stay entirely below the blocking limit CC and will not be allowed to pass, or else they will exceed the said limit but slightly so that they will be capable of causing only very small plate current impulses.

What follows from the foregoing is that the sizes of R and C must be adapted to the rhythm of the signals, that is to say, to the length of the spaces or intermissions between two consecutive impulses in one and the same signal.

Instead of the mode of volume regulation as hereinbefore described, also any other automatic regulation is usable provided it involves the time-constants hereinbefore demonstrated to be essential and necessary.

Having thus described my invention, what I claim is:

1. The method of indicating the position of a mobile receiver, including a high voltage relay tube having a control grid electrode connected to an exciting circuit including biasing means in the form of a resistance shunted by a condenser and output electrodes connected to an indicating device, relative to the axis of two overlapping beams of radiating energy each carrying different signal impulses of a complementary nature which combine along the overlapping path to produce a third characteristic signal, which includes the steps of applying energy from both of said beams to said exciting circuit, producing biasing currents in said exciting circuit, the intensity of which bear a predetermined relation to the frequency of recurrence of the strongest of said signal impulses and is such as to produce a potential drop in said resistance as charged by said condenser sufficient to permit peaks only of the strongest signalling impulses to produce current flow into said output electrodes, said charge being large enough to prevent the potential in said resistance from falling between signal impulses sufficient to permit the weaker signals to cause current flow in said output circuit.

2. In a receiving system employing an electron tube the grid of which is suitably biased by means of a leak resistor in shunt with a capacitor, the method of discriminating between signals transmitted along each of a plurality of directional beams, which comprises causing said tube to be self-biased by the stronger of the signals and causing the effects of the weaker signals to be substantially nullified by virtue of a strong negative bias on said grid, following the reception of a strong signal of limited duration.

WILHELM RUNGE.